US011556656B2

(12) United States Patent
Swami et al.

(10) Patent No.: US 11,556,656 B2
(45) Date of Patent: Jan. 17, 2023

(54) EXCLUSIVE OR ENGINE ON RANDOM ACCESS MEMORY

(71) Applicant: Micron Technology, Inc., Boise, ID (US)

(72) Inventors: Shivam Swami, Folsom, CA (US); Sean S. Eilert, Penryn, CA (US); Ameen D. Akel, Rancho Cordova, CA (US); Kenneth Marion Curewitz, Cameron Park, CA (US); Hongyu Wang, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 106 days.

(21) Appl. No.: 16/582,871

(22) Filed: Sep. 25, 2019

(65) Prior Publication Data

US 2021/0089663 A1    Mar. 25, 2021

(51) Int. Cl.
*G06F 21/60* (2013.01)
*H03K 19/21* (2006.01)
*G06F 21/79* (2013.01)

(52) U.S. Cl.
CPC ............ *G06F 21/602* (2013.01); *G06F 21/79* (2013.01); *H03K 19/21* (2013.01)

(58) Field of Classification Search
CPC ........ G06F 21/602; G06F 21/79; H03K 19/21
See application file for complete search history.

(56) References Cited

U.S. PATENT DOCUMENTS

| 5,014,327 | A  | * | 5/1991  | Potter    | G06K 9/6276 |
|-----------|----|---|---------|-----------|-------------|
|           |    |   |         |           | 382/220     |
| 7,284,133 | B2 | * | 10/2007 | Watanabe  | G06Q 20/341 |
|           |    |   |         |           | 713/189     |
| 8,879,295 | B1 | * | 11/2014 | Barth, Jr.| G11C 29/76  |
|           |    |   |         |           | 365/201     |

(Continued)

FOREIGN PATENT DOCUMENTS

CN    1971542 A  *  5/2007
KR    101219191        1/2013

(Continued)

OTHER PUBLICATIONS

Chhabra, S., et al., "i-NVMM: A Secure Non-Volatile Main Memory System with Incremental Encryption," ISCA '11, Jun. 4-Jun. 8, 2011, San Jose, CA, pp. 177-188.

(Continued)

*Primary Examiner* — Ali S Abyaneh
(74) *Attorney, Agent, or Firm* — Greenberg Traurig

(57) ABSTRACT

Methods and apparatus of Exclusive OR (XOR) engine in a random access memory device to accelerate cryptographical operations in processors. For example, an integrated circuit memory device enclosed within a single integrated circuit package can include an XOR engine that is coupled with memory units in the random access memory device (e.g., having dynamic random access memory (DRAM) or non-volatile random access memory (NVRAM)). A processor (e.g., System-on-Chip (SoC) or Central Processing Unit (CPU)) can have encryption logic that performs cryptographical operations using XOR operations that are performed by the XOR engine in the random access memory device using the data in the random access memory device.

17 Claims, 5 Drawing Sheets

(56) References Cited

U.S. PATENT DOCUMENTS

| | | |
|---|---|---|
| 9,461,818 B2 | 10/2016 | Henry et al. |
| 10,176,039 B2 | 1/2019 | Amato et al. |
| 2014/0115346 A1* | 4/2014 | Ekberg ................ G06F 21/6218 |
| | | 713/193 |
| 2016/0011807 A1* | 1/2016 | Seol .................... G11C 11/5628 |
| | | 711/102 |
| 2016/0085625 A1 | 3/2016 | Amato et al. |
| 2017/0310462 A1 | 10/2017 | Gueron et al. |
| 2017/0316218 A1 | 11/2017 | Hwang et al. |
| 2018/0307848 A1* | 10/2018 | Leiseboer ........... G06F 12/0891 |
| 2019/0114222 A1 | 4/2019 | Amato et al. |
| 2019/0114400 A1 | 4/2019 | Lunghi et al. |
| 2021/0004495 A1* | 1/2021 | Osugi ..................... G06F 7/584 |

FOREIGN PATENT DOCUMENTS

| | | |
|---|---|---|
| KR | 101757560 | 7/2017 |
| WO | 2016044520 A1 | 3/2016 |

OTHER PUBLICATIONS

International Search Report and Written Opinion, PCT/US2020/051906, dated Dec. 30, 2020.

\* cited by examiner

EXCLUSIVE OR ENGINE ON RANDOM ACCESS MEMORY

FIELD OF THE TECHNOLOGY

At least some embodiments disclosed herein relate to memory systems in general, and more particularly, but not limited to the exclusive or engine in the memory systems configured to facilitate cryptographical operations of processors.

BACKGROUND

A memory sub-system can include one or more memory components that store data. A memory sub-system can be a data storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). The memory components can be, for example, non-volatile memory components and volatile memory components. Examples of memory components include memory integrated circuits. Some memory integrated circuits are volatile and require power to maintain stored data. Some memory integrated circuits are non-volatile and can retain stored data even when not powered. Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM). In general, a host system can utilize a memory sub-system to store data at the memory components and to retrieve data from the memory components.

For example, a computer can include a host system and one or more memory sub-systems attached to the host system. The host system can have a central processing unit (CPU) in communication with the one or more memory sub-systems to store and/or retrieve data and instructions. Instructions for a computer can include operating systems, device drivers, and application programs. An operating system manages resources in the computer and provides common services for application programs, such as memory allocation and time sharing of the resources. A device driver operates or controls a particular type of devices in the computer; and the operating system uses the device driver to offer resources and/or services provided by the type of devices. A central processing unit (CPU) of a computer system can run an operating system and device drivers to provide the services and/or resources to application programs. The central processing unit (CPU) can run an application program that uses the services and/or resources. For example, an application program implementing a type of applications of computer systems can instruct the central processing unit (CPU) to store data in the memory components of a memory sub-system and retrieve data from the memory components.

A host system can communicate with a memory sub-system in accordance with a pre-defined communication protocol, such as Non-Volatile Memory Host Controller Interface Specification (NVMHCI), also known as NVM Express (NVMe), which specifies the logical device interface protocol for accessing non-volatile storage devices via a Peripheral Component Interconnect Express (PCI Express or PCIe) bus. In accordance with the communication protocol, the host system can send commands of different types to the memory sub-system; and the memory sub-system can execute the commands and provide responses to the commands. Some commands instruct the memory sub-system to store data items at addresses specified in the commands, or to retrieve data items from addresses specified in the commands, such as read commands and write commands. Some commands manage the infrastructure in the memory sub-system and/or administrative tasks, such as commands to manage namespaces, commands to attach namespaces, commands to create input/output submission or completion queues, commands to delete input/output submission or completion queues, commands for firmware management, etc.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to an exclusion or (XOR) engine in the memory system. For example, an integrated circuit (IC) memory device (e.g., having dynamic random access memory (DRAM) or non-volatile random access memory (NVRAM)) can be configured to have an XOR and configured to provide random memory access to accelerate the encryption/decryption operations in a processor connected to the memory device. The processor (e.g., a system-on-chip for a mobile device, a central processing unit (CPU)) can have the encryption logic that uses the services provided by the XOR engine configured in the device of random access memory (RAM). In some embodiments, at least some XOR operations encountered in the encryption/decryption are performed using the data in the random access memory and the XOR engine in the random access memory to accelerate the encryption/decryption process.

Figure 1:
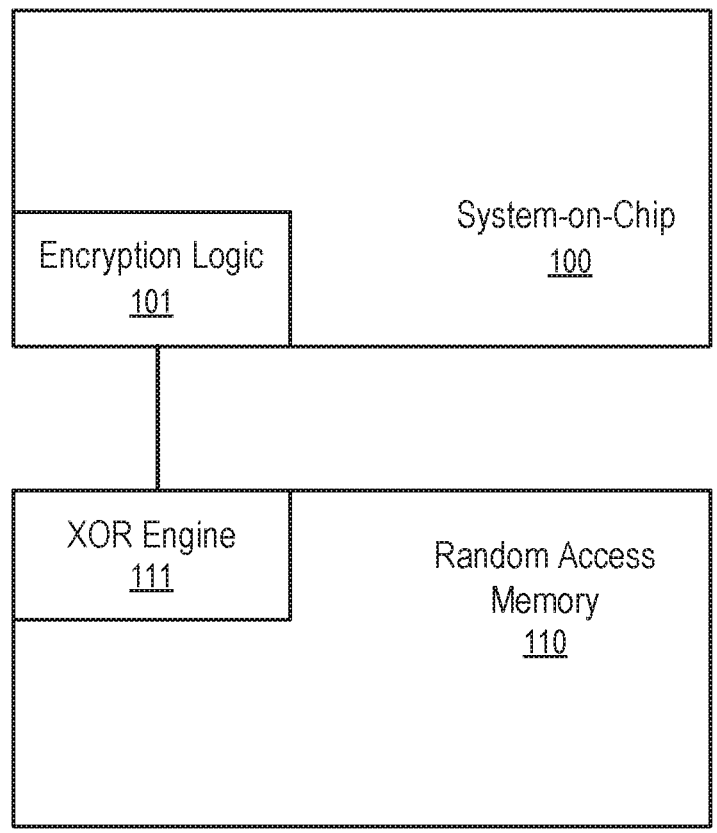
FIG. 1 illustrates a system having an exclusion or (XOR) engine configured on random access memory.

FIG. 1 illustrates a system having an exclusion or (XOR) engine configured on random access memory. For example, a single memory device enclosed within an integrated circuit (IC) package can include an XOR engine 111 and random access memory 110 (e.g., DRAM or NVRAM). The XOR engine 111 can be used to accelerate the encryption/decryption operations using data in the random access memory 110. For example, the system of FIG. 1 can include a processor, such as System-on-chip (Soc) 100. The SoC can include encryption logic 101 that can be implemented via software instructions, hardware logic, and/or a combination of software instructions and hardware logic. The encryption logic 101 in the SoC 100 can be configured to perform cryptographical operations (e.g., encryption and/or decryption)

using XOR operations performed by the XOR engine 111 on data stored in the random access memory 110.

Figure 2:
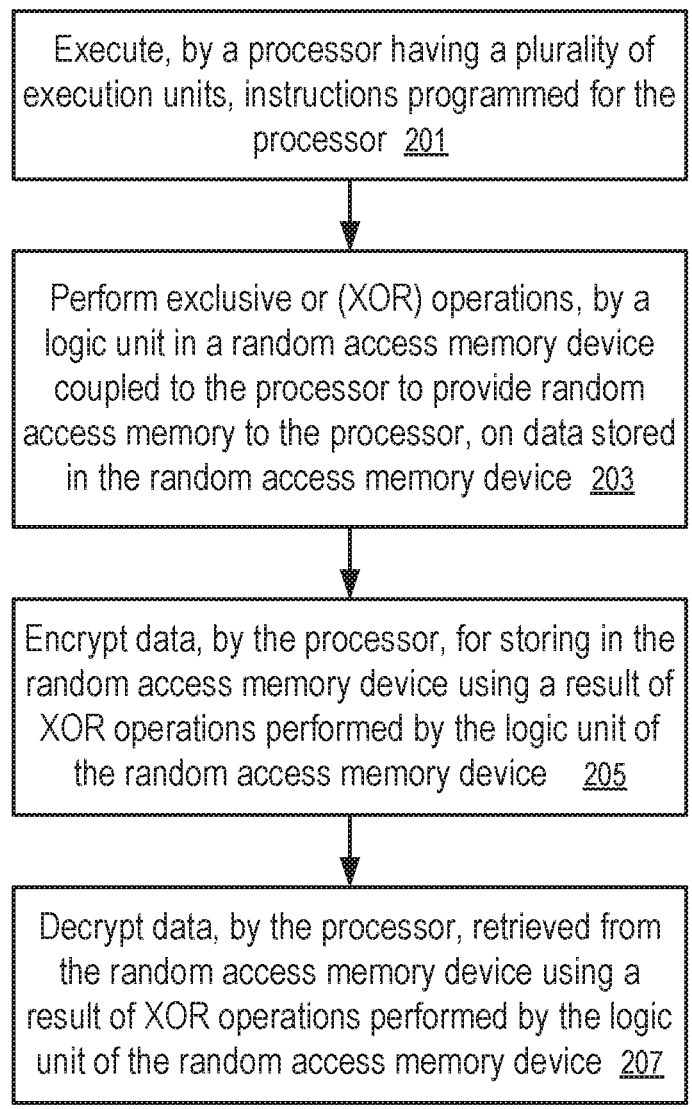
FIG. 2 shows a method to perform cryptographical operations using an exclusion or (XOR) engine on random access memory.

FIG. 2 shows a method to perform cryptographical operations using an exclusion or (XOR) engine on random access memory. For example, the method of FIG. 2 can be performed in the system of FIG. 1. In general, the method of FIG. 2 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 201, a processor 100 having a plurality of execution units executes instructions programmed for the processor 100.

At block 203, a logic unit (e.g., 111) of a random access memory device 110 coupled to the processor 100 to provide random access memory to the processor 100 performs exclusive or (XOR) 111 operations on data stored in the random access memory device 110.

At block 205, the processor 100 encrypts data for storing in the random access memory device 110 using a result of XOR operations performed by the logic unit of the random access memory device 110.

At block 207, the processor 100 decrypts data retrieved from the random access memory device 110 using a result of XOR operations performed by the logic unit of the random access memory device 110.

Figure 3:
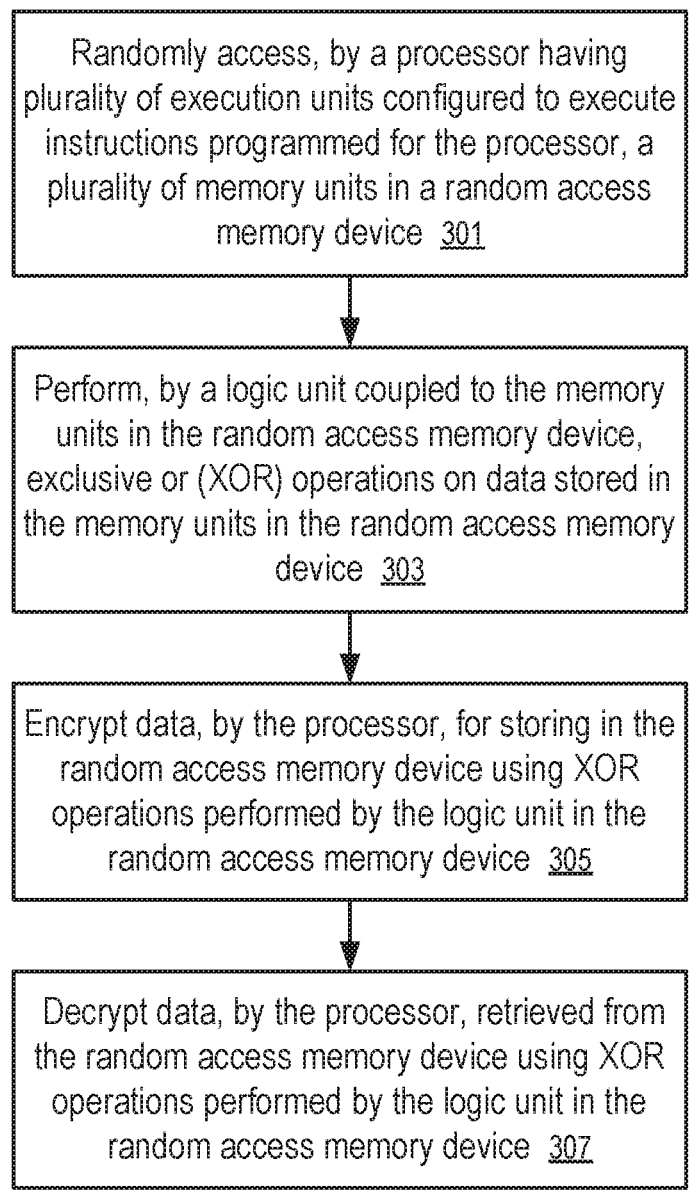
FIG. 3 shows another method to perform cryptographical operations using an exclusion or (XOR) engine on random access memory.

FIG. 3 shows another method to perform cryptographical operations using an exclusion or (XOR) engine on random access memory. For example, the method of FIG. 3 can be performed in the system of FIG. 1 or, in general, by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 301, a processor 100, having a plurality of execution units configured to execute instructions programmed for the processor 100, randomly accesses a plurality of memory units in a random access memory device 110.

At block 303, a logic unit, coupled to the memory units in the random access memory device 110, performs exclusive or (XOR) 111 operations on data stored in the random access memory device 110.

At block 305, the processor 100 encrypts 301 data for storing in the random access memory device 110 using XOR operations performed by the logic unit in random access memory device 110.

At block 307, the processor 100 decrypts 301 data retrieved from the random access memory device 110 using XOR operations performed by the logic unit in random access memory device 110.

Figure 4:
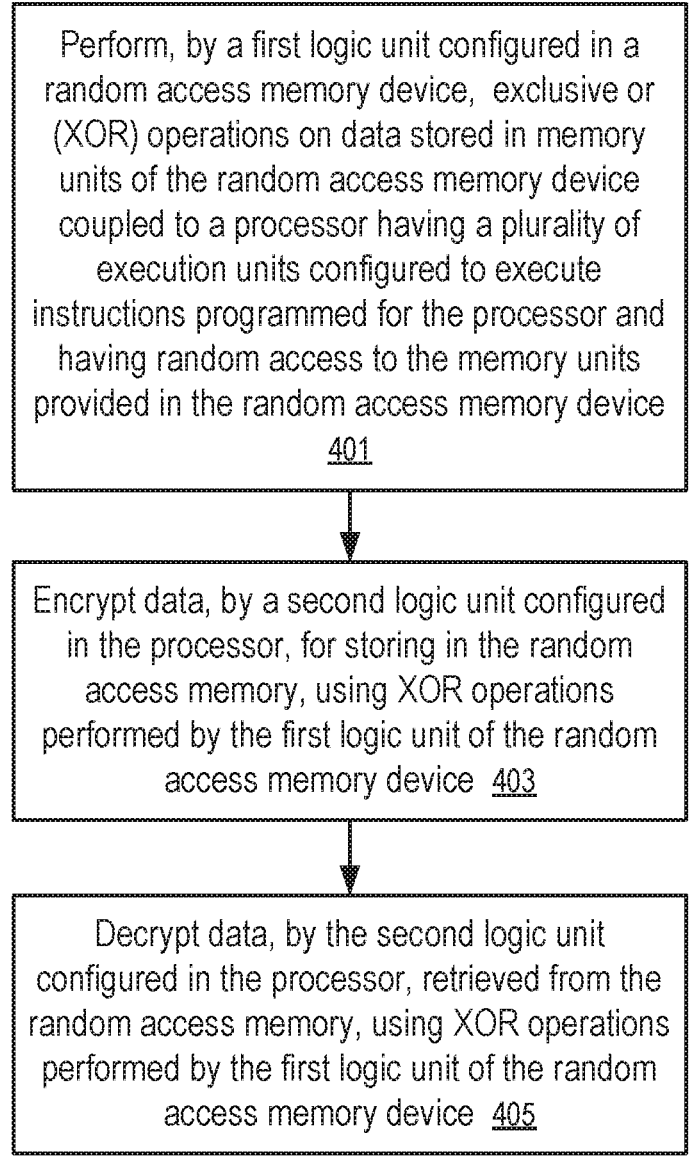
FIG. 4 shows a further method to use an exclusion or (XOR) engine on random access memory.

FIG. 4 shows a further method to use an exclusion or (XOR) engine on random access memory. For example, the method of FIG. 4 can be performed in the system of FIG. 1 or, in general, by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 401, a first logic unit performs exclusive or (XOR) operations on data stored in memory units of the random access memory device 110 coupled to a processor 100 having a plurality of execution units configured to execute instructions programmed for the processor 100 and having random access to the memory units provided in the random access memory device 110.

At block 403, a second logic unit 101 configured in the processor 100 encrypts data for storing in the random access memory device 110 using XOR operations performed by the first logic unit of the random access memory device 110.

At block 405, the second logic unit 101 configured in the processor 100 decrypts data retrieved from the random access memory device 110 using XOR operations performed by the first logic unit of the random access memory device 110.

Figure 5:
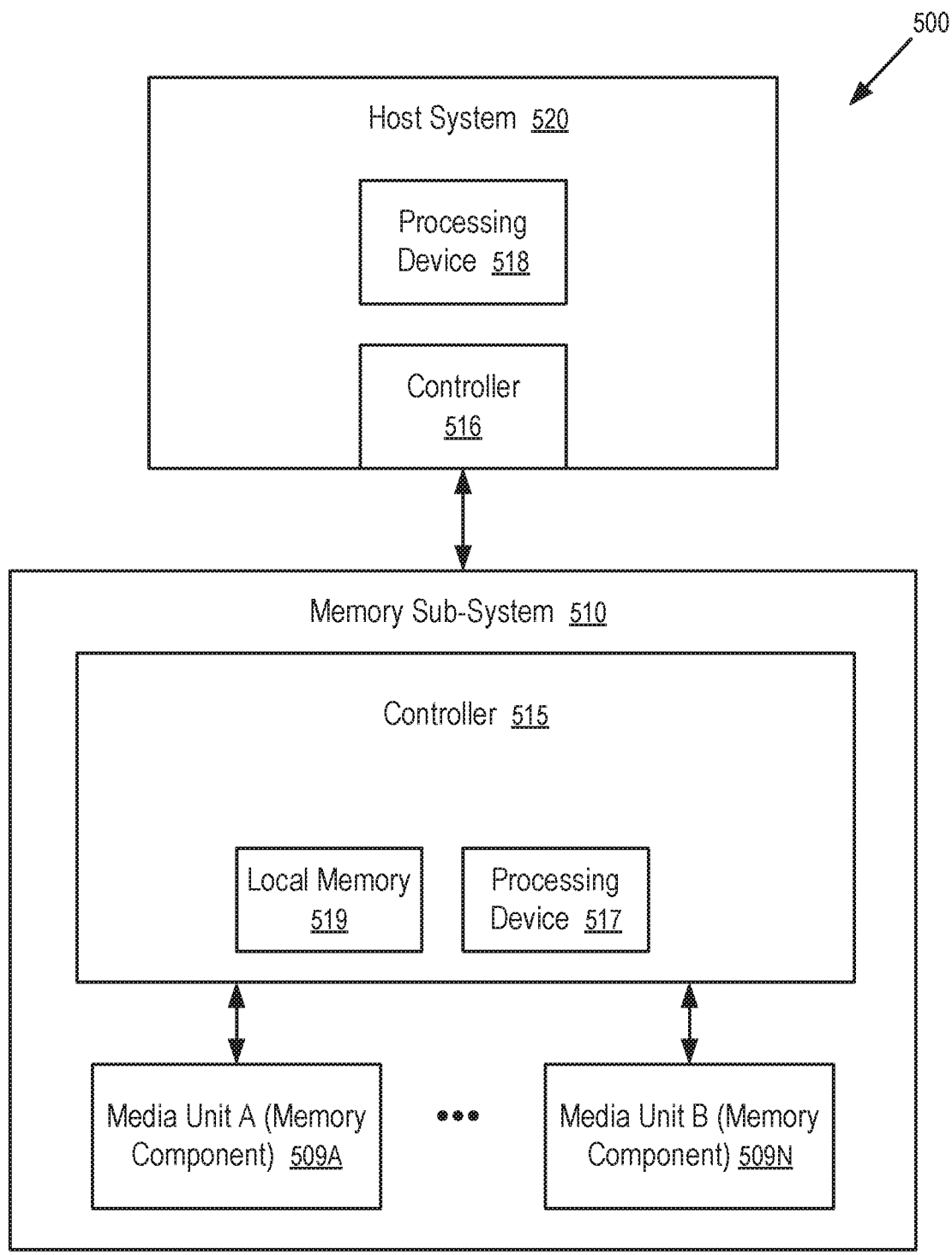
FIG. 5 illustrates an example computing system in which the techniques of (XOR) engines can be used.

FIG. 5 illustrates an example computing system in which the techniques of (XOR) engines can be used. The system of FIG. 5 includes a memory sub-system 510 and a host system 520. For example, the XOR engine 111 of FIG. 1 can be implemented in a processing device 517 and/or the controller 515 of the memory sub-system 510; and the encryption logic 101 of FIG. 1 can be implemented in or via the processing device (518) and/or the controller 516 of the host system 520.

In general, the memory sub-system can also be referred to as a "memory device." An example of a memory sub-system is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc.

Another example of a memory sub-system is a data storage device/system that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD).

In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

The memory sub-system 510 can include media, such as media units/memory components 509A to 509N. In general, the media units/memory components 509A to 509N can be volatile memory components, non-volatile memory components, or a combination of such. Each of the media units/memory components 509A to 509N can perform operations to store, record, program, write, or commit new data independent of the operations of other media units/memory components 509A to 509N. Thus, the media units/memory components 509A to 509N can be used in parallel in executing write commands. In some embodiments, the memory sub-system is a storage system. An example of a storage system is a solid state drive (SSD). In some embodiments, the memory sub-system 510 is a memory module. Examples of a memory module includes a DIMM, NVDIMM, and NVDIMM-P. In some embodiments, the memory sub-system 510 is a hybrid memory/storage sub-system. In general, the computing environment can include a host system 520 that uses the memory sub-system 510. For example, the host system 520 can write data to the memory sub-system 510 and read data from the memory sub-system 510.

The host system 520 can be a computing device such as a desktop computer, laptop computer, network server, mobile device, or such computing device that includes a memory and a processing device. The host system 520 can include or be coupled to the memory sub-system 510 so that the host system 520 can read data from or write data to the memory sub-system 510. The host system 520 can be coupled to the memory sub-system 510 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 520 and the memory sub-system 510. The host system 520 can further utilize an NVM Express (NVMe) interface to access the memory components 509A to 509N when the memory sub-system 510 is coupled with the host system 520 by the PCIe interface. The physical host interface can provide an interface for passing control, address, data, and other signals between the memory sub-system 510 and the host system 520. FIG. 5 illustrates a memory sub-system 510 as an example. In general, the host system 520 can access multiple memory sub-systems via a same communication connection, multiple separate communication connections, and/or a combination of communication connections.

The host system 520 includes a processing device 518 and a controller 516. The processing device 518 of the host system 520 can be, for example, a microprocessor, a central processing unit (CPU), a processing core of a processor, an execution unit, etc. In some instances, the controller 516 can be referred to as a memory controller, a memory management unit, and/or an initiator. In one example, the controller 516 controls the communications over a bus coupled between the host system 520 and the memory sub-system 510.

In general, the controller 516 can send commands or requests to the memory sub-system 510 for desired access to memory components 509A to 509N. The controller 516 can further include interface circuitry to communicate with the memory sub-system 510. The interface circuitry can convert responses received from memory sub-system 510 into information for the host system 520.

The controller 516 of the host system 520 can communicate with controller 515 of the memory sub-system 510 to perform operations such as reading data, writing data, or erasing data at the memory components 509A to 509N and other such operations. In some instances, the controller 516 is integrated within the same package of the processing device 518. In other instances, the controller 516 is separate from the package of the processing device 518. The controller 516 and/or the processing device 518 can include hardware such as one or more integrated circuits and/or discrete components, a buffer memory, a cache memory, or a combination thereof. The controller 516 and/or the processing device 518 can be a microcontroller, special purpose logic circuitry (e.g., a field programmable gate array (FPGA), an application specific integrated circuit (ASIC), etc.), or another suitable processor.

In general, the media units/memory components 509A to 509N can include any combination of the different types of non-volatile memory components and/or volatile memory components. An example of non-volatile memory components includes a negative-and (NAND) type flash memory. Each of the memory components 509A to 509N can include one or more arrays of memory cells such as single level cells (SLCs) or multi-level cells (MLCs) (e.g., triple level cells (TLCs) or quad-level cells (QLCs)). In some embodiments, a specific memory component can include both an SLC portion and an MLC portion of memory cells. Each of the memory cells can store one or more bits of data (e.g., data blocks) used by the host system 520. Although non-volatile memory components such as NAND type flash memory are described, the memory components 509A to 509N can be based on any other type of memory such as a volatile memory. In some embodiments, the memory components 509A to 509N can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 509A to 509N can be grouped as memory pages or data blocks that can refer to a unit of the memory component used to store data.

The controller 515 of the memory sub-system 510 can communicate with the memory components 509A to 509N to perform operations such as reading data, writing data, or erasing data at the memory components 509A to 509N and other such operations (e.g., in response to commands scheduled on a command bus by controller 516). The controller 515 can include hardware such as one or more integrated circuits and/or discrete components, a buffer memory, or a combination thereof. The controller 515 can be a microcontroller, special purpose logic circuitry (e.g., a field programmable gate array (FPGA), an application specific integrated circuit (ASIC), etc.), or another suitable processor. The controller 515 can include a processing device 517 (processor) configured to execute instructions stored in local memory 519. In the illustrated example, the local memory 519 of the controller 515 includes an embedded memory configured to store instructions for performing various processes, operations, logic flows, and routines that control operation of the memory sub-system 510, including handling communications between the memory sub-system 510 and the host system 520. In some embodiments, the local memory 519 can include memory registers storing memory pointers, fetched data, etc. The local memory 519 can also include read-only memory (ROM) for storing micro-code. While the example memory sub-system 510 in FIG. 5 has been illustrated as including the controller 515, in another embodiment of the present disclosure, a memory sub-system 510 may not include a controller 515, and can instead rely upon external control (e.g., provided by an external host, or by a processor or controller separate from the memory sub-system).

In general, the controller 515 can receive commands or operations from the host system 520 and can convert the commands or operations into instructions or appropriate commands to achieve the desired access to the memory components 509A to 509N. The controller 515 can be responsible for other operations such as wear leveling operations, garbage collection operations, error detection and error-correcting code (ECC) operations, encryption operations, caching operations, and address translations between a logical block address and a physical block address that are associated with the memory components 509A to 509N. The controller 515 can further include host interface circuitry to communicate with the host system 520 via the physical host interface. The host interface circuitry can convert the commands received from the host system into command instructions to access the memory components 509A to 509N as well as convert responses associated with the memory components 509A to 509N into information for the host system 520.

The memory sub-system 510 can also include additional circuitry or components that are not illustrated. In some embodiments, the memory sub-system 510 can include a cache or buffer (e.g., DRAM) and address circuitry (e.g., a row decoder and a column decoder) that can receive an address from the controller 515 and decode the address to access the memory components 509A to 509N.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A computing apparatus, comprising:
   a processor having a plurality of execution units configured to execute instructions programmed for the processor, the processor comprising encryption logic configured to encrypt data; and
   a random access memory device coupled to the processor to provide random access memory to the processor, the random access memory device comprising an exclusive or (XOR) engine configured to perform exclusive or (XOR) operations on data stored in the random access memory device;
   wherein the processor is configured to implement the encryption logic to encrypt the data for storing in the random access memory device using the XOR operations performed by the XOR engine, and the processor is further configured to decrypt data retrieved from the random access memory device; and
   wherein the processor is in communication with the XOR engine of the random access memory device to cause the XOR engine to perform the XOR operations for encrypting data for storing in the random access memory device and decrypting data retrieved from the random access memory device.

2. The computing apparatus of claim 1, wherein the random access memory device is enclosed in an integrated circuit package.

3. The computing apparatus of claim 2, wherein the random access memory device includes a plurality of memory units and the XOR engine configured on a same substrate.

4. The computing apparatus of claim 3, wherein the processor includes a system on a chip.

5. The computing apparatus of claim 3, wherein the encryption logic further configures the processor to decrypt data retrieved from the random access using XOR operations performed by the XOR engine in the random access memory device.

6. The computing apparatus of claim 1, wherein the at least a portion of XOR operations are performed in response to read commands from the processor.

7. A random access memory device, comprising:
   a plurality of memory cells configured to be randomly accessed by a processor, wherein the processor has a plurality of execution units configured to execute instructions programmed for the processor, the processor comprising encryption logic configured to encrypt data; and
   an exclusive or (XOR) engine coupled to the memory units cells configured to perform exclusive or (XOR) operations on data stored in the random access memory device;
   wherein the processor is configured to implement the encryption logic to encrypt the data for storing in the random access memory device using the XOR operations performed by the XOR engine, and the processor is further configured to decrypt data retrieved from the random access memory device; and
   wherein the processor is in communication with the XOR engine of the random access memory device to cause the XOR engine to perform the XOR operations for encrypting data for storing in the random access memory device and decrypting data retrieved from the random access memory device.

8. The random access memory device of claim 7, wherein the random access memory device is enclosed in an integrated circuit package.

9. The random access memory device of claim 8, wherein the random access memory device includes the plurality of memory cells and the XOR engine configured on a same substrate.

10. The random access memory device of claim 9, wherein the processor includes a system on a chip.

11. The random access memory device of claim 9, wherein the encryption logic further configures the processor to decrypt data retrieved from the random access using XOR operations performed by the XOR engine in the random access memory device.

12. The random access memory device of claim 7, wherein the at least a portion of XOR operations are performed in response to write commands from the processor.

13. A processor, comprising:
   a plurality of execution circuits configured to execute instructions programmed for the processor the processor, is configured to be coupled to a random access memory device to randomly access memory units provided in the random access memory device, the random access memory device having an exclusive or (XOR) engine configured to perform exclusive or (XOR) operations on data stored in the random access memory device; and
   an encryption logic configured to be implemented by the processor using the XOR operations performed by the XOR engine to encrypt data for storing in the random access memory device and decrypt data retrieved from the random access memory device, wherein the processor is in communication with the XOR engine to cause the XOR engine to perform the XOR operations used to encrypt the data and decrypt the data.

14. The processor of claim 13, wherein the random access memory device and the XOR engine are enclosed in a single integrated circuit package.

15. The processor of claim 14, wherein the random access memory device includes a plurality of memory units and the XOR engine configured on a same substrate.

16. The processor of claim 15, wherein the processor includes a system on a chip.

17. The processor of claim 13, wherein the at least a portion of XOR operations are performed in response to read and write commands from the processor.

* * * * *